(No Model.)

F. A. LOMONT.
PULLEY.

No. 395,572. Patented Jan. 1, 1889.

WITNESSES:
Herbert J. Hartman
J. F. Curtice

Francis A. Lomont INVENTOR.

BY
H. C. Hartman
ATTORNEY.

UNITED STATES PATENT OFFICE.

FRANCIS A. LOMONT, OF FORT WAYNE, INDIANA, ASSIGNOR OF ONE-HALF TO JOHN DREIBELBISS, OF SAME PLACE.

PULLEY.

SPECIFICATION forming part of Letters Patent No. 395,572, dated January 1, 1889.

Application filed July 30, 1888. Serial No. 281,427. (No model.)

*To all whom it may concern:*

Be it known that I, FRANCIS A. LOMONT, a citizen of the United States, residing at Fort Wayne, in the county of Allen, in the State of Indiana, have invented certain new and useful Improvements in Pulleys; and I hereby declare that the following is a full, clear, and exact description of the invention, which will enable others skilled in the art to which it appertains to make and use the same, reference being had to the accompanying drawings, which form part of this specification.

My invention relates to improvements in pulleys removable and adjustable to shafts in position; and the objects of my improvement are to provide a new device in the construction of pulleys whereby they can most easily and economically be put on shafts and removed without disconnecting the shafting or taking it down for that purpose, and, secondly, to conserve the greatest strength in the pulley possible and consistent with a removable pulley. I attain these objects by the mechanism and construction illustrated in the accompanying drawings, in which—

Figure 1:
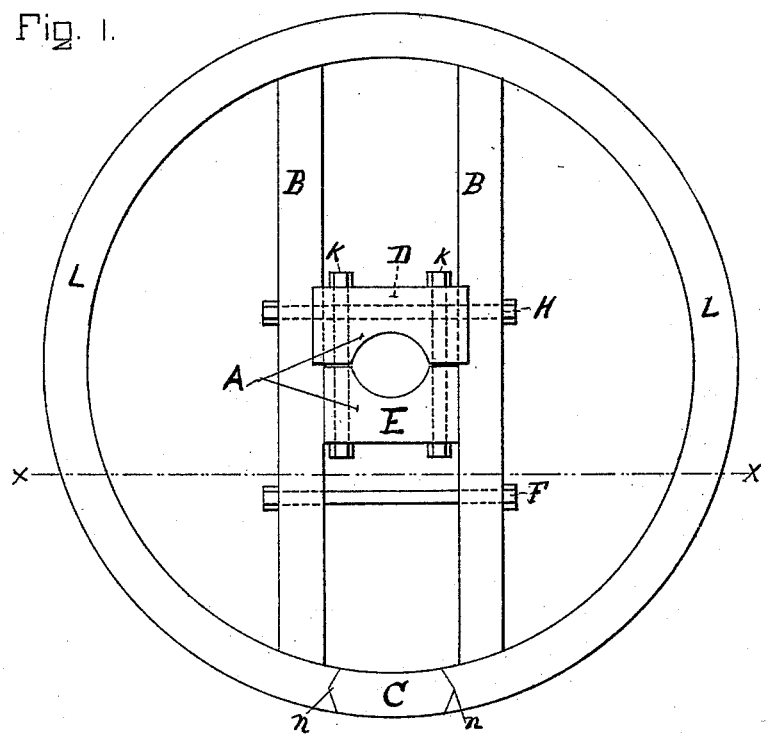
Figure 2:
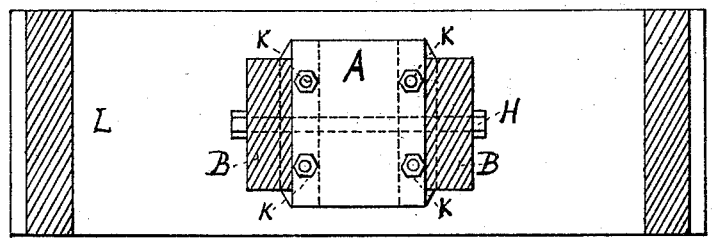

Figure 1 is a plan view of a pulley embodying the device. Fig. 2 is a view of a cross-section of Fig. 1 on the line $x\ x$.

Similar letters refer to similar parts throughout the several views.

The drawings show a pulley constructed of wood; but I do not confine myself to that material, as it is obvious that the devices are applicable to pulleys made of any other material.

The construction is as follows: Two arms, B B, are suitably fastened to the continuous portion of the rim of the pulley. To these arms one part, D, of the hub A is securely fastened by the bolt H and by being joined into the arms. The other part, E, of the hub fits in between the arms, and is secured and fastened to the other part, D, of the hub by four bolts, K K K K. This part E of the hub is then made separately removable. A section, C, of the rim of the pulley is cut out with the ends $n\ n$ in V shape, as shown, for the purposes of removal and assisting to hold it in place. It may be cut out in various other forms, which readily suggest themselves, so as to answer the same purposes. The bolt F passes through the arms B B for the purpose of fastening the section C in place by compression. It is placed between the hub and the rim.

I have shown and described a preferable method of constructing my devices.

The essential parts of my invention consist, first, in a split hub, one part of which is firmly secured in place and the other part is made so as to be easily removable, and means provided to securely fasten it to the fixed part D of the hub; second, in a single removable section, C, of the rim of the pulley and the means provided to fasten it securely in place.

The operation is as follows: The section C, the bolt F, and the cap E of the hub are removed and the pulley is passed over the shaft, the shaft passing through the openings thus made until it is in place in the hub. The cap E is then securely fastened in place by the bolts K K K K. Then the section C is replaced in the rim L and the bolt F is replaced and the arms B B drawn toward each other as tightly as may be by screwing up its nut. This action also draws the rim tightly against the section C, which, with the construction or V shape of its ends, is thus held firmly in place. The pulley is now ready for use.

Having fully described my invention, what I claim, and desire to secure by Letters Patent, is—

1. The combination of a pulley-rim provided with a single removable section, the arms B B, securely attached to the larger portion of the rim, the hub-section D, permanently secured to the arms B B, the cap or hub-section E, removably secured to the fixed hub-section, the bolts K, to clamp the hub-sections to the shaft, and the bolt F, to clamp the ends of the rim against the ends of its removable section, all substantially as described.

2. The combination of the arms B B, securely attached to the rim of a pulley, the hub-section D, permanently secured to the arms B B, the cap or hub-section E, removably secured to the fixed hub-section, and the bolts K, to clamp the hub-sections on the shaft, all substantially as described.

In testimony whereof I hereto subscribe my name, in the presence of two witnesses, this 26th day of July, A. D. 1888.

FRANCIS A. LOMONT.

Witnesses:
H. C. HARTMAN,
J. F. CURTICE.